United States Patent
Mackie et al.

(10) Patent No.: US 12,144,313 B2
(45) Date of Patent: Nov. 19, 2024

(54) METHOD FOR MITIGATING AIRBORNE PATHOGENS FROM A LIVESTOCK HOUSE

(71) Applicant: Almarai Company, Riyadh (SA)

(72) Inventors: Andrew Mackie, Riyadh (SA); Dermot Looney, Riyadh (SA)

(73) Assignee: Almarai Company, Riyadh (SA)

( * ) Notice: Subject to any disclaimer, the term of this patent is extended or adjusted under 35 U.S.C. 154(b) by 112 days.

(21) Appl. No.: 17/335,622

(22) Filed: Jun. 1, 2021

(65) Prior Publication Data
US 2022/0381458 A1    Dec. 1, 2022

(30) Foreign Application Priority Data

May 30, 2021  (SA) .................................. 121420759
May 30, 2021  (SA) .................................. 121420760

(51) Int. Cl.
*A01K 1/00*   (2006.01)
*A01K 31/20*  (2006.01)
(Continued)

(52) U.S. Cl.
CPC ............ *A01K 1/0052* (2013.01); *A01K 31/20* (2013.01); *F24F 7/003* (2021.01); *F24F 7/06* (2013.01);
(Continued)

(58) Field of Classification Search
CPC .... F24F 11/30; F24F 11/76; F24F 8/10; F24F 7/003; F24F 7/06; F24F 2110/10;
(Continued)

(56) References Cited

U.S. PATENT DOCUMENTS 4,334,577 A * 6/1982 George ................. F24F 12/001
                                                    165/909
4,517,921 A * 5/1985 Haythornthwaite ........................
                                                     A01K 1/0047
                                                          119/448
(Continued)

FOREIGN PATENT DOCUMENTS

CN    108056025 A    5/2018
CN    109673526 A *  4/2019  ............... A01K 1/00
(Continued)

OTHER PUBLICATIONS

European Search Report, Application No. 22174905.4-1105, dated Nov. 22, 2022.

*Primary Examiner* — Avinash A Savani
*Assistant Examiner* — Dana K Tighe
(74) *Attorney, Agent, or Firm* — Finnegan, Henderson, Farabow, Garrett & Dunner, LLP (57) ABSTRACT

A method for mitigating airborne pathogens from a livestock house by using a cross-flow ventilation system, which is fluidly connected to a livestock house and configured to control the air quality and movement by introducing ambient air into at least one air filtration system that is attached to a side wall of the house. The method includes flowing conditioned air from the air chamber into the house through at least one ventilation panel to the opposing sidewall with a laminar or substantially laminar flow of air and removing the air from the house using an exhaust fan attached to a side wall opposite the side wall containing the air filtration system.

19 Claims, 5 Drawing Sheets

(51) Int. Cl.
| | |
|---|---|
| *F24F 7/003* | (2021.01) |
| *F24F 7/06* | (2006.01) |
| *F24F 8/10* | (2021.01) |
| *F24F 8/108* | (2021.01) |
| *F24F 11/30* | (2018.01) |
| *F24F 11/76* | (2018.01) |
| *F24F 110/10* | (2018.01) |
| *F24F 110/20* | (2018.01) |
| *F24F 110/40* | (2018.01) |
| *F24F 110/70* | (2018.01) |
| *F24F 120/10* | (2018.01) |

(52) U.S. Cl.
CPC ............... *F24F 8/10* (2021.01); *F24F 8/108* (2021.01); *F24F 11/30* (2018.01); *F24F 11/76* (2018.01); *F24F 2110/10* (2018.01); *F24F 2110/20* (2018.01); *F24F 2110/40* (2018.01); *F24F 2110/70* (2018.01); *F24F 2120/10* (2018.01)

(58) Field of Classification Search
CPC ............... F24F 2110/20; F24F 2110/40; F24F 2110/70; F24F 2120/10; A01K 1/0052
USPC ......................................................... 454/338
See application file for complete search history.

(56) References Cited

U.S. PATENT DOCUMENTS

| | | | | |
|---|---|---|---|---|
| 5,775,988 | A * | 7/1998 | Eakin | F24F 11/75 |
| | | | | 454/259 |
| 6,321,687 | B1 * | 11/2001 | Lemmon | A01K 1/0047 |
| | | | | 119/448 |
| 8,132,535 | B2 * | 3/2012 | Correa | A01K 31/22 |
| | | | | 119/448 |
| 11,202,439 | B2 * | 12/2021 | Gribble | A01K 1/0052 |
| 2012/0055414 | A1 * | 3/2012 | Correa | A01K 31/04 |
| | | | | 119/448 |

FOREIGN PATENT DOCUMENTS

| | | | | |
|---|---|---|---|---|
| CN | 112400702 A | * | 2/2021 | ............... A01K 1/00 |
| KR | 20110122270 A | | 11/2011 | |
| KR | 101483237 B1 | * | 1/2015 | ............... A01K 1/00 |
| WO | WO 2012/166509 A3 | | 12/2012 | |
| WO | WO 2019/022596 A1 | | 1/2019 | |

* cited by examiner

METHOD FOR MITIGATING AIRBORNE PATHOGENS FROM A LIVESTOCK HOUSE

BACKGROUND

Technical Field

The present disclosure is generally related to systems, methods and facilities for animal husbandry especially facilities, systems and methods for hatching, growing and housing fowl such as chickens.

Description of Related Art

It is estimated that the world hatches, raises, slaughters and consumes over 50 billion chickens annually, a more than 10 fold increase in the last 50 years. Chickens represent the greatest portion of poultry (e.g., domestic fowl, such as chickens, turkeys, ducks, and geese) that is captively bred, hatched, raised and marketed.

Conventional methods and systems of raising poultry permit raising large numbers of poultry in groups of particular age class. Maintaining an age class (e.g., chickens of relatively uniform age in which the age of the chickens does not vary by more than 10 days, preferably 5 days among all individuals in the group) has many advantages. Raising chickens according to age class allows production to be staged over time such that a production facility has a relatively steady and constant output of marketable livestock.

Raising poultry in groups defined by age class also provides economies of scale and reduces incompatibilities in temperament and behavior between older and younger age classes of livestock. Importantly, age classes permit maximizing usable space. For example, hatchlings (e.g., chicks) require relatively less space in comparison to marketable broiler chickens. During the production of an age class, a livestock facility may be arranged to accommodate the space needs for chickens at different growth stages, e.g., the utilizable space may grow with the age class. Barriers and movable walls can be used to gradually expand the production area thereby providing sufficient exercise room and comfort areas as chickens grow. This in turn provides the producer with a means of minimizing the usage of utilities such as electricity for lighting and temperature control and reduces feed loss that otherwise might occur if feed is dispersed over a production area that is too large for small chickens to effectively forage.

In order to achieve economies of scale a single production facility (e.g., poultry house) may accommodate more than 50,000 birds in a single age class. Concentrating large numbers of animals in an enclosed area substantially increases risks relating to factors such as predation and disease. Pathogens and infectious agents may quickly spread through a dense population of chickens in an enclosed facility. Further, production facilities are typically located close to consumers. Tropical, dry, continental and polar regions may expose livestock to temperatures that are substantially greater or lower than would otherwise be tolerable to a chicken. These environmental factors are typically addressed by providing an enclosed facility (e.g., poultry house) as a means for controlling ingress and egress of animals, temperature, lighting, food distribution and removal of waste and manure. However, conventional livestock facilities are unable to sufficiently control diverse environmental factors in extreme conditions such as those encountered in geographical locations that experience extreme high and/or low temperatures. The demands of protecting, cooling, feeding and heating dense concentrations of livestock while concurrently reducing or eliminating risks associated the uncontrolled spread of pathogens and infectious agents is an unmet challenge.

The poultry house of the present disclosure is able to substantially reduce or eliminate the transmission of infectious agents and pathogens among chickens of a flock, preferably a flock of chickens of the same age class. As a result, substantially lower mortality is achieved over a growth and production cycle. Lower mortality translates into greater yield of marketable birds and an overall improvement in efficiency. Such diseases include any of avian influenza, *E-coli* infection, infectious bronchitis, and Newcastle Disease as well as air borne or food borne pathogens formed by, e.g., *Salmonella, E-coli,* and *Campylobacter*. Particular improvements can be noted with diseases such as H9N2 Low Pathogenic Avian Influenza (LPAI), Highly Pathogenic Avian Influenza (HPAI), *Mycoplasma synoviae, Salmonella* spp., and Infectious Laryngotrachieitis (ILT).

The spread of infectious agents within a poultry house has many negative consequences, one of the most evident is the death of poultry and the associated costs in terms of manpower and lost livestock. Birds that are infected with pathogens and/or infectious agents have lesser resistance to naturally-occurring pathogens present in manure and waste. For example, the decomposition and degradation of manure may lead to high concentrations of ammonia which, in a poultry house, may inhibit the growth (e.g., accumulation of mass) of birds. Even in a flock that represents a single age class, birds infected with pathogens gain weight at a much slower rate than healthy birds. This in turn forms a flock that lacks uniformity in bird size and hence is of lower marketable value and/or causes less efficient conversion of feed by the birds.

In view of the foregoing, there is need for a system, method and facility for hatching, and raising livestock, such as poultry (e.g., broilers). The system, method and facility described herein provide a physically controlled environment that reduces exposure to pathogens, infectious agents and inhibits epidemics thereby improving the survival rate of chickens to maturity and the yield of marketable livestock. There is also a need for a method to maximize utilized space and provide a controlled environment that reduces the risk of loss through disease/infection of the livestock.

SUMMARY

There is disclosed a method for mitigating airborne pathogens from a livestock house. In an embodiment, the method comprises using a cross-flow ventilation system, which is fluidly connected to a livestock house comprising two long and parallel sidewalls and two short end walls that are parallel to each other and perpendicular to the side walls to form a tunnel section of the house, wherein the cross-flow ventilation system is configured to control the air quality and movement by the following: introducing ambient air into at least one air filtration system that is attached to a side wall of the house; conditioning the air in the air filtration system by performing at least one step selected from filtering, cooling, disinfecting, or pressurizing the air; introducing the conditioned air into an air chamber; flowing the conditioned air from the air chamber into the house through at least one ventilation panel to the opposing sidewall with a laminar or substantially laminal flow of air; and removing the air from the house using an exhaust fan attached to a side wall opposite the side wall containing the air filtration system.

The foregoing general description of the illustrative embodiments and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the drawings, like reference numerals designate identical or corresponding parts throughout the several views. Further, as used herein, the words "a," "an" and the like generally carry a meaning of "one or more," unless stated otherwise. The drawings are generally drawn to scale unless specified otherwise or illustrating schematic structures or flowcharts.

The present inventors have identified a problem with existing livestock house designs, such as broiler house designs. These problems include airborne illness that is easily spread within the broiler house. To address these problems, there is disclosed, at a high level, an air filtration system that prevents the spreading of illness by filtering contaminates from air incoming air circulated within the livestock house.

The Inventors have further identified the following solutions: (1) improved airflow system, (2) improved filtration system, and (3) combination of improved airflow system and improved filtration system in a building, such as a livestock or broiler house. For example, a livestock house can be understood as a system that includes subsystems and components that work together in to achieve reduced transmission of airborne illness. Non-limiting examples of these systems include the livestock house, such as the broiler house, with airflow system and filtration system.

Non-limiting examples of a first subsystem includes an airflow system (inlet, outlet, and climate control features). In one embodiment, this first subsystem includes a Component 1, such as a building, which can be defined in a variety of ways, including by length and width to achieve a long, narrow building. The building can also be defined by the direction of airflow (e.g., tunnel mode—parallel to the long axis vs. cross flow—perpendicular to the long axis). The building can also be defined by various interior compartments, such as how the various rooms, gables, and like are separated or connected. The building can also be defined by the various sealing elements, such as the roof, walls, windows, doors, between rooms. Component 1 may further include pressure control elements to achieve positive pressure, negative pressure, or combinations thereof depending on the location of the elements.

In one embodiment, the subsystem described herein includes Component 2, which may comprise fans to provide desired parallel flow of serial flow of air. The quantity, locations and control mechanisms of such fans, e.g., whether manual, automated as described herein.

In one embodiment, the subsystem described herein includes Component 3, which may comprise anti-backdraft devices. The quantity, locations and control mechanisms of such fans, e.g., whether passive, actively controlled as described herein.

In one embodiment, the subsystem described herein includes Component 4, which may comprise vents including the locations and control mechanisms e.g., whether manual, automated as described herein.

In one embodiment, the subsystem described herein includes Component 5, which may comprise cooling devices, including the quantity and location used alone or with combinations with fans/filters/etc.

In one embodiment, there is disclosed a subsystem 2, which comprises filtration system. For example, the filtration may include an arrangement and packaging of multi-stage filters. The multi-stage filters may comprise Components 140, that include a prefilter, a main filter, a fine filter and a filter unit, respectively. In one embodiment, there is described the use of three filters. The air passes through a first filter, which comprise an ultra-media. Next, the air passes through a pre-filter. Finally, the air passes through a third filter, which is described as a main filter. In one embodiment, the pre-filter is attached or fitted directly to the main filter.

Subsystem 2 may further comprise a Component 5, which is one or more filter cabinets. The cabinet may include quantity an access panel design (for filter replacement, repair), alone or in combinations with other components, such as the previously described fans, anti-backflow, vents, etc. In one embodiment, the disclosed system includes combinations of subsystems 1 and 2.

The systems, subsystems and methods described herein are based on the understanding that ventilation control is an important factor effecting the growth and development of chickens. Typically, chickens need about 1 m$^3$ of fresh air/hr/kg for comfort and for removal of excess heat. A typical broiler chicken may weigh 30-60 g at the beginning of a production cycle and preferably grows to a weight of about 500 g by day 10-15 and a weight of about 2 kg when ready for slaughter. The final weight of the broiler chicken varies according to marker preferences. Conventional livestock facilities are maintained at a single ventilation level through a production and growth cycle from chick to market size. As time progresses during the growth cycle, the mass of the chickens increases thus requiring a corresponding increase in ventilation to maintain safe temperature and living conditions. Variable ventilation as birds progress through the growth cycle reduces energy costs and permits tuning ventilation needs to changes in bird behavior as a function of age. As an example of variable ventilation, ventilation may be selectively timed for short durations then switched off. Ventilation is tailored to bird mass by progressively increasing the duration of ventilation as during the growth progresses.

Ventilation is necessary in order to remove carbon dioxide ($CO_2$) which would otherwise quickly rise to toxic levels or levels that depress weight gain or other toxic gases such as sulfides and ammonia that may otherwise form in house.

In one aspect of the present disclosure, ventilation control may be dependent on a $CO_2$ monitoring device, such as a microprocessor controlled device, which is part of a control system that integrates $CO_2$ levels with other production factors such as temperature and lighting. Carbon dioxide levels may be monitored with a sensing device located in the facility and used as a control or trigger mechanism for initiating ventilation fans or ventilation openings to introduce fresh air when threshold concentration of $CO_2$ is exceeded.

A ventilation system includes ventilation devices that are interconnected with a controller that contains a microprocessor with circuitry configured with instructions to control the ventilation devices based on one or more inputs from, for example, a $CO_2$ sensing device, a temperature sensing device, a humidity sensing device, a bird mass calculator, and a bird age calculator. The instructions may include one or more algorithms that function to balance factors such as inside temperature, ventilation load, ventilation pressure, humidity, growth stages, time of day, feeding and the like. The controller may be communicatively linked to the devices and sensors through wires or wirelessly.

Open ventilation poultry houses have been conventionally used for raising large bird flocks. Especially in hot climates, tunnel ventilation is one technique of ventilating in poultry houses, typically constructed and operated as closed buildings. In tunnel ventilation, natural or forced air moves from one end of a rectangular poultry house to the other end down a long axis of the building, especially air cooled by first passing through an evaporative cooling apparatus.

In contrast to the typical method of ventilation of a poultry house, one aspect of the poultry house of the present disclosure, ventilation is primarily or exclusively cross ventilation (e.g., lateral air movement across, such as perpendicular to, the long axis of the poultry house), for at least a portion of the growth cycle and/or during certain seasons of the year. For the avoidance of doubt, "cross ventilation" as used herein is defined as air flow that is substantially perpendicular to the long axis of the poultry house. As a consequence, the total distance that air must flow in order to ventilate the poultry house is minimized in comparison to the air flow in a poultry house configured to utilize primarily tunnel ventilation (e.g., air flow primarily down the long axis of the poultry house). A shorter air flow distance may expose fewer birds to the same volume of air that may have picked up contaminants from upwind birds, hence cross ventilation provides birds with relatively fresher air and a lower risk of infection. This results in a reduced risk of transmission of airborne pathogens and infectious agents between birds of a flock. For example, in a tunnel ventilation system an infected bird located at the upwind side of ventilation in a poultry house may infect a greater number of birds which are downwind in comparison to the number of birds that would be downwind in a cross ventilated poultry house.

In another aspect of the poultry house of the present disclosure, airflow that moves laterally across the long axis of the poultry house has greater laminar flow characteristics in comparison to tunnel ventilation. Tunnel ventilation may cause substantial mixing of air within the poultry house. Mixing during tunnel ventilation may be caused by the resistance of tunnel walls to airflow and the presence of objects within the airflow (such as light fixtures, feeding stations and the like) that disrupt laminar flow. Air resistance with poultry house sidewalls and air contact with objects that may be in the path of air flow are minimized in a crossflow arrangement.

Figure 2:
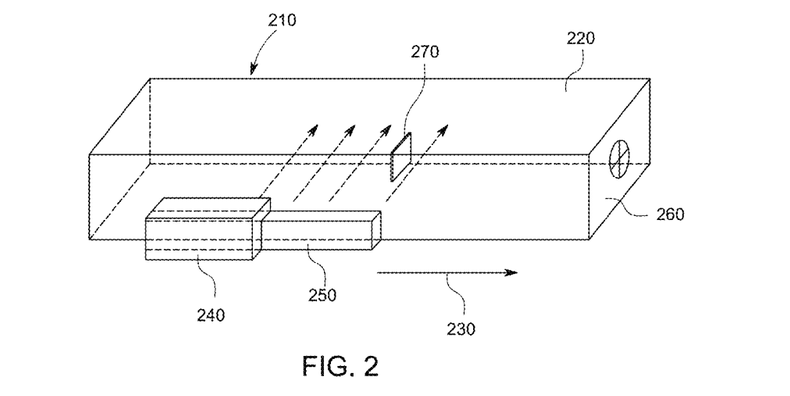
FIG. 2 shows a poultry house having a filter house and an air hall, antechamber or plenum.

Airflow in the poultry house of the present disclosure is illustrated in FIG. 2. The poultry house 210 shows airflow in both a cross flow (lateral) orientation 220 and in a tunnel flow orientation 230. In various embodiments, airspeed for lateral cross flow is about 0.1-5 m/s, such as 0.5-5 m/s, 1.5-4.5 m/s, 2-4 m/s, 2.5-3.5 m/s or about 3 m/s.

Tunnel flow, or at least partial flow parallel to the long axis of the poultry house, may be present as an optional component of air flow in the present disclosure; however, airflow is mainly in a crossflow orientation during chicken growth, for example during the period of time that elapses between introduction of hatchlings (chicks) and harvesting of marketable broilers.

Several features enhance the laminar nature of crossflow in the poultry house of the present disclosure. FIG. 2 shows a filter house 240 and an air hall (e.g., air chamber, antechamber or plenum) 250. Note that FIG. 2 is intended to represent only a portion of a poultry house. The poultry house of the present disclosure may include a plurality of filter houses and, in an embodiment, an air hall (e.g., air tunnel, antechamber or plenum) that extends for a major portion of the side wall along the long axis of the poultry house, such as at least 50% of the length of the poultry house, at least 60%, at least 70%, at least 80%, at least 90% and in an embodiment, the air hall, air plenum or antechamber extends along the entire length of the poultry house that corresponds with an interior space utilized for growing chickens.

The air hall serves an important purpose with respect to the introduction and flow of air for crossflow and laminar or near laminar flow across the long axis of the poultry house. Air first enters the filter house 240 where it is filtered, cooled, optionally disinfected and/or pressurized before entry into the air hall. After entering in the air hall, the air pressure along the entire length of the air hall is essentially the same. The air hall opens to the interior of the enclosed space of the poultry house through a series of mechanically activated ventilation panels. These ventilation panels are described in FIG. 3.

In one embodiment, ventilation panels extend in one or more portions along the length of the poultry house. When in an open or partially open position, the ventilation panels allow passage of air from the filter house into the poultry house in a manner that reduces or eliminates pressure differentials along the long axis of cross flow ventilation of the poultry house. The ventilation panels may be present in sections corresponding with different filter houses or different portions of the air hall.

In an embodiment, the ventilation panels are mounted on the side wall of the poultry house at a height that is less than one half the height of the poultry house and are configured so that the ventilation panels lean inwards into the interior space of the poultry house but remain fastened to the stub wall/side wall. Opening in this manner helps prevent the escape or egress of birds. In an optional embodiment, one or more ventilation panels may be in a position that is different from one or more other ventilation panels thereby providing pressure differentials or flow differentials at different portions of the poultry house. Ventilation openings are typically at a higher elevation and are function to avoid wind chill and may be optionally oriented to make them unattractive for exploration by birds.

During operation of the poultry house air may be drawn through the interior space through a plurality of upper air inlets (ventilation panels) that open, such as inwardly, along a major portion of the axial length of the poultry house, e.g., along the major portion of the wall separating the air hall from the enclosed grow area of the poultry house. In an embodiment, the air hall is fluidly connected to the poultry house through upper air ventilation panels that are regularly spaced along the entire length of the poultry house side walls. Using upper air ventilation panels are desired ingress points for filtered air and help keep moving air off of the poultry in comparison to lower mounted ventilation panels (e.g., ventilation panels located at floor height or bird height) and thereby increase the comfort of the birds.

In one embodiment, upper air ventilation panels are located at regular intervals, such as every 2 m, or 1 m or about 0.5 m along the length of the poultry house. The upper air ventilation panels provide an open space (e.g., air inlets) that extends at least 30% of the total length of the poultry house, such as 40%, or 50%, or 60% or even 70% of the entire length of the poultry house. The air inlets are dimensionally longer than tall with a desired aspect ratio of about 1:10, such as about 1:8, 1:6, 1:4 or 1:2 (e.g., height of air inlet:length of air inlet). In other embodiments the upper air ventilation panels represent a single panel that extends lengthwise substantially the entire length of the poultry house.

Exhaust fans may be located at the opposite longs ends of the poultry house (260) shown in FIG. 2 and may be configured either to push air into the enclosed space of the poultry house and/or remove or exhaust air from the enclosed space.

To further enhance the laminar nature of the airflow crosswise through the poultry house, one or more air directing panels may be present inside the poultry house (270). The air directing panels 270, which may be suspended from the ceiling, function to limit intermixing as air moves in a crossflow orientation through the poultry house. Air directing panels are optionally mounted from the ceiling portion of the poultry house and typically extend such that the bottom portion of the panel is at a height of 2-5 m, such as 2.5-4 m, or 3-4 m from the floor of the poultry house. The panels may extend across at least 50% of the width of the poultry house, but can extend at least 60%, 70% or 80% across the width of the poultry house. A plurality of suspended panels may be spaced evenly at distances of 1-10, 2-8, 3-6 or about 5 m along the long axis of the poultry house.

In an alternative embodiment, when tunnel ventilation is desired, as opposed to crossflow ventilation, it may be achieved by utilizing a plurality of fans located at one or more ends of the poultry house. Tunnel ventilation may be arranged so that air flows and is ejected primarily through a single end of the poultry house or through both ends of the poultry house (requiring ejector fans at both ends of the poultry house and airflow currents operating in opposite directions), such as through one end only, or only from the end of the poultry house opposite the end at which the service room is located. In this embodiment, incoming air can be entirely passed through the filter houses prior to contact with the poultry and may be ejected through a combination of the side walls fans and/or the fans located at the ends of the poultry house.

Figure 3:
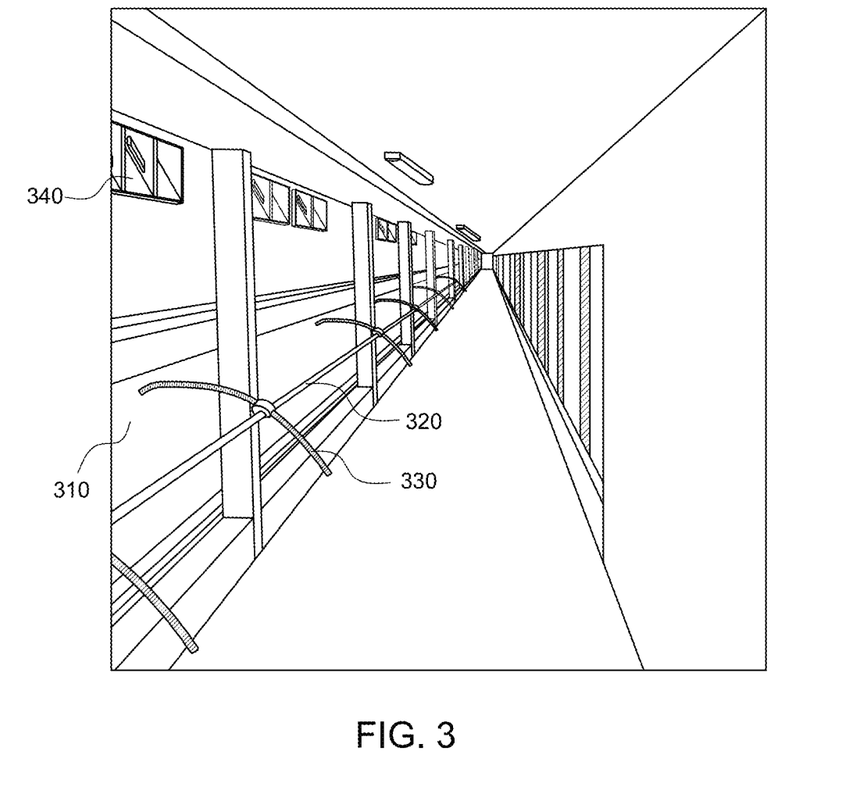
FIG. 3 shows an interior view of an air hall, antechamber or plenum with ventilation panels and control mechanism.9

FIG. 3 shows the air directing panels that permit entry of filtered air into the enclosed space of the air hall of the poultry house. The panels in FIG. 3 (310) are shown in an open position (in the case of FIG. 3 the panel (310), wherein a single panel extends a major portion of the length of the poultry house and the air hall. A plurality of ventilation panels may be positioned perpendicular to the long axis of the poultry house down its length. In one embodiment, the ventilation panel is a single panel of unitary construction such that it is operable with a single control and motor mechanism. The single panel of plurality of panels are connected to a control rod (320) which functions to open or close single panels or a plurality of panels at one time. The control rod is connected to an electric or hydraulic motor that rotates and engages a gear and a steering mount (330) connected to each ventilation panel. As the control rod rotates in a particular direction, the ventilation panel opens in a controlled manner to pass air from the air hall into the interior space of the poultry house. Additional ventilation points or openings may also be present at a higher elevation on the wall defining the enclosed space of the poultry house (340) in the embodiment shown in FIG. 3. The additional ventilation openings are at a higher elevation along the sidewall of the poultry house than the ventilation panels. The additional ventilation openings are typically greater in number and have substantially less area in terms of total area for creating a passageway for air between the air hall into the enclosed space of the poultry house. Such passageways may be open permanently or may be individually controlled. In one embodiment, the additional ventilation points described herein are on the top of the side wall and are the primary ventilation points and are used most frequently. Larger tunnel doors and/or inlets located on the stub wall at the front end of the house may be used in tunnel ventilation mode.

The poultry house of the present disclosure is able to substantially reduce or eliminate the transmission of infectious agents and pathogens among chickens of a flock, preferably a flock of chickens of the same age class. As a result, substantially lower mortality is achieved over a growth and production cycle. Lower mortality translates into greater yield of marketable birds and an overall improvement in efficiency. Such diseases include any of avian influenza, *E-coli* infection, infectious bronchitis, and Newcastle Disease as well as air borne or food borne pathogens formed by, e.g., *Salmonella, E-coli*, and *Campylobacter*. Particular improvements can be noted with diseases such as H9N2 Low Pathogenic Avian Influenza (LPAI), Highly Pathogenic Avian Influenza (HPAI), *Mycoplasma synoviae, Salmonella* spp., and Infectious Laryngotrachieitis (ILT).

The spread of infectious agents within a poultry house has many negative consequences, one of the most evident is the death of poultry and the associated costs in terms of manpower and lost livestock. Birds that are infected with pathogens and/or infectious agents have lesser resistance to naturally-occurring pathogens present in manure and waste. For example, the decomposition and degradation of manure may lead to high concentrations of ammonia which, in a poultry house, may inhibit the growth (e.g., accumulation of mass) of birds. Even in a flock that represents a single age class, birds infected with pathogens gain weight at a much slower rate than healthy birds. This in turn forms a flock that lacks uniformity in bird size and hence is of lower marketable value and/or causes less efficient uptake of feed by the birds.

In one embodiment of the present disclosure, in order to reduce the risks of introducing pathogens and infectious agents into the control room of the poultry house, a controlled positive pressure air system is utilized thereby reducing the risk of unintended or unwanted ingress of pathogens or infectious agents that might be present in the environment inside the control room of the poultry house. In an embodiment, the interior space of the control room of the poultry house is maintained at a positive pressure that is 1-60 Pascal, such as 10-60 Pascal, such as 20-50 Pascal, 30-40 Pascal or about 35 Pascal greater than the ambient outside air (atmospheric) pressure. In one embodiment of the invention positive pressure is maintained inside the poultry house through a system of filtered air injection and controlled air egress. In this embodiment filtered air may be injected into the poultry house by fans positioned at the wall between the air hall and the enclosed space of the poultry house.

In one embodiment, the poultry house is designed, constructed and operated under negative pressure conditions. During negative pressure operation the atmospheric pressure inside the enclosed space of the poultry house is lower than ambient atmospheric pressure in the immediate vicinity outside of the poultry house. Negative pressure can be achieved and maintained by utilizing more exhaust fan capacity in comparison to the forced air fan capacity or air supply capacity for air injected into the enclosed space and/or passed through the filter houses of the poultry house. In one embodiment no air injection fans are used during the operation of the poultry house and all air movement through the enclosed space of the poultry house is achieved by the use of exhaust fans, for example exhaust fans mounted in the wall opposite the wall of the air hall. Optionally, one or more additional exhaust fans may be mounted and operated on either the front or rear end of the poultry house. In order to minimize mixing of air within the enclosed space of the poultry house, the use of exhaust fans located on the wall opposite the air hall is chosen.

When operating in a negative pressure mode, the pressure differential between the interior of the enclosed space of the poultry house and ambient exterior pressure is in the range of 5 to 70 Pa, such as 10-60 Pa, 15-35 Pa, 20-50 Pa or about 25-40 Pa, or about 30 Pa. The pressure differential between the enclosed space of the poultry house and ambient exterior pressure is minimized to reduce the risk of unintended air entry through cracks or other openings that may permit passage of unfiltered and/or and uncooled air into the enclosed space of the poultry house.

In one embodiment of the invention no injection fans are used during normal operation of the poultry house. Air flows transversely across the width of the poultry house using primarily the ejection fans located at the wall opposite the wall to which the filter houses are directly connected. One or more ejection fans located at an end of the poultry house, such as at a gable position may be used in combination with or in place of one or more or all of the side wall ejection fans.

In negative pressure conditions, the poultry house is not exhausted through a ceiling rib vent or ceiling point vent that is located at a roof, soffit, or other location of the poultry house other than a side wall or end wall/gable. Optionally, the poultry house may be operated without use of a fan or air egress point at a horizontal terminus wall.

The poultry house may include a system to mimic natural light cycles. Light cycles can include a first lighting duration corresponding to daylight and second lighting duration corresponding to darkness or diminished light. The light system typically mimics daylight duration variation to be representative of changes thereby stimulating development of the poultry.

Chickens may be attracted to adventitious light that concentrates at openings of the poultry house and thereby experience psychological stress during growth. In an embodiment, the poultry house is light tight such that all lighting is controlled by the light system and the chickens do not experience natural light. Controlled lighting reduces crowding and results in more uniformly developed flocks. Optionally the exhaust and/or supply fans have a plenum or antechamber space for the purpose of eliminating light infiltration through the exhaust fans.

Temperature is another factor that is controlled and monitored during a growth and production cycle. In the early stages of a production cycle the chickens (chicks) are unable to generate sufficient body heat to maintain a temperature that maximizes growth and weight gain. Generally, the first 10-14 days of a production cycle may require a net heat input. In a hot climate such as that around the equator or in arid regions such as the Middle East, cooling may be required during all phases of the growth cycle of the chickens, especially during the hot seasons when day time outside temperatures may rise to 50° C. The environment inside a livestock facility may be controlled to provide a growth stage temperature of around 32° C. but may vary in ranges of 26-40° C., 28-36° C. or 30-34° C., e.g., up until about day 10-14. In later stages of the growth/production cycle the chickens typically generate more heat than would otherwise be needed to maintain a desired temperature in a facility located in a temperate region. The facility may need cooling throughout the growth and production cycle or after day 10-14 of the growth/production cycle. In an embodiment, temperatures tend to decrease during later stages of the growth/production cycle and may be in ranges of 18-30° C., 20-28° C., 22-26° C. or about 24° C.

An internal air flow temperature of 30° C., such as 5-30° C., 10-25° C., or about 15° C. can be achieved by passage of air through the evaporative cooling system and passage through the living space of the poultry house. The temperature changes apparent to the livestock in comparison to outside ambient air may include the effects of wind chill which provides further comfort and for the poultry housed therein.

Cooling is generally accomplished by forced air ventilation with refrigeration provided by evaporative cooling. Ventilation may recirculate inside air but may rely on pulling in outside air to replace exhausted inside air.

Heat can be provided from sources such as solar heat, radiant heaters, such as using combustible gas, or biomass.

In one embodiment, heating is provided by rows of resistive heaters, incandescent lamps or infrared lamps arranged in one or more rows lengthwise down the long axis of the poultry house. In another embodiment combustion heaters may be used at one or more locations in the poultry house. Combustion heaters include for example propane heaters, wood stoves, diesel heaters and the like. The lamps may be at a density of 0.3-2 lamps/m, such as 0.5-1.5 lamps/m or about 1-1.25 lamps/m spacing along the long axis of the poultry house. Heating lamps may be installed at different sites within the poultry house. In an embodiment, at least one row of evenly spaced heat lamps or other heaters is mounted at a height of 0.25-2 m, such as 0.5-1.5 m, 0.75-1 m from the floor. One or more additional rows of similarly or differently spaced heaters may be mounted at a height of 1.5-5 m, such as 2-3 m or about 2.5 m from the floor of the poultry house. The rows of lighting/heating fixtures may be present at densities of 1-10 rows/poultry house, such as 2-8 rows/poultry house, 3-6 rows/poultry house, 4-5 rows/poultry house. The lighting source is typically mounted inside a protected plastic or steel frame which prevents birds from contacting or damaging the heating element. In alternate arrangements incoming air may be heated immediately after filtration (e.g., when evaporative cooling is not in operation) by one or more resistive or combustion heaters located upstream or inside the air hall.

Water is provided by drippers placed at roughly evenly spaced distances in rows that extend along the long axis of the poultry house. The drippers permit birds to freely access water. In an embodiment, open water containers are eliminated to reduce the risk of transmitting water-borne diseases from bird to bird inside the poultry house.

In an embodiment, feeding stations and/or feeding pans are spaced evenly inside the poultry house. Feeding stations may be spaced generally in line with the drippers or heating lamps/devices that are present in the poultry house. In one embodiment, feeding stations are spaced apart from drippers and heating sources thus encouraging birds to move more frequently within the poultry house. Feed may be distributed at feeding stations (e.g., feeding pans) placed within the poultry house. The feeding pans may be in direct contact with the floor of the poultry house. Feeding pans are at times in contact with the floor. As birds get bigger feeding pans may be raised in height such that they are not in contact with the floor. In an embodiment, the feeding pans or a feed system is suspended from the ceiling of the house and can be raised and lowered as required depending of bird requirements and growth stage. Alternately the poultry house may include a moving feeding station such as a feeding conveyor that constantly circulates fresh feed inside the poultry house and requires less manpower for refilling. In an embodiment, at least 2 feed conveyors are used with each feed conveyor moving in a direction opposite the other. Feeding using opposite movement helps reduce crowding of birds to one side of the poultry house.

Depending on whether the poultry house is used for breeders (also referred to as "layers") or broilers, the location and configuration of the feeding stations might change. For example, in a broiler house, the feed typically runs from the front of the house to the back of the house. In contrast, in a breeder house, the feeding stations can run in either direction in the house.

The poultry house of the present disclosure may be constructed of light gauge steel paneling for its walls, interior partitions and roof. Steel paneling is impervious to sunlight, has a long lifetime, is easily cleaned and disinfected, and may be modified by the addition of insulating materials. In an embodiment, at least the roof of the poultry house is insulated with a foam-type insulating material such as blown-in foam. A panel-type insulation such as polystyrene and/or foamed polyethylene/polypropylene may also be used for this purpose. In some embodiments the poultry house has an attic space that is separately ventilated to avoid excessive heat build inside the poultry house. Such ventilated attics typically have a ridge line ventilation system that permits convective or forced air ventilation. Portions of the roof of the poultry house may include translucent light-transmitting panels that provide interior light into the poultry house. Such translucent panels may be covered with a mechanically activated and retractable covers so as to provide for complete control of light entering the poultry house.

The poultry house of the present disclosure has a shape in the form of an elongated rectangle or polygon. The width of the poultry house may be from 20 to 80 feet, such as 30-70, 40-60 or about 50 feet. There is no limit to the length of the poultry house so long as it is in an elongated rectangular or polygonal form. Typically, the length is 5-20 times the width, such as 8-15 or about 10 times the width. The width is typically measured from the exterior of the side walls defining the interior space in which birds roam not including any extensions or auxiliary spaces in which birds are excluded or do not roam. The length is measured from the exterior of a first end (front) to the exterior of a second end (rear). Although the poultry house may have multiple levels, for example levels that provide birds additional roaming space, dusting space, scratching space or socializing space, the poultry house typically has a single level with birds roaming directly on the floor. The poultry house does not need to be tall nor does it otherwise need to have sufficient dimensions for enabling bird flight because it is intended mainly for raising broilers for meat. A typical interior height from the floor to the ceiling may vary from 5-20 feet, such as 8-18 feet, or 10-15 feet, or, on average, about 10 feet. In an embodiment, the roof of the poultry house is sloped and therefore the interior height from the floor may vary according to the slope of the roof.

The floor of the poultry house may be a continuous concrete slab. The floor surface exposed to contact with birds may optionally be tiled, painted or covered/coated with a thermoplastic or thermoset material. A continuous slab floor eliminates the presence of recesses or discontinuities that might permit the infiltration of gases, liquids or infectious agents, and permits more thorough cleaning and disinfection.

Poultry housed in the poultry house may be in direct contract with the floor. In other embodiments the floor is covered with a litter agent such as sawdust, shredded cellulosic material, rice husk, powder derived from ground date seed, synthetic materials such as polystyrene beads, or mineral materials such as perlite and vermiculite. In order to reduce the risk of contamination from floor litter the chickens are housed without any such absorbent materials. The litter agent serves as an absorbent to capture solid and liquid waste produced by poultry. The litter agent may be dispersed on the floor of the poultry house to a depth of 0.5-6 inches, such as 1-4 inches, 2-5 inches or 3-4 inches. The litter agent may be removed from the poultry house on a periodic basis during the growth cycle of a flock of birds. In an embodiment the poultry house includes a retractable bottom panel along at least one of a side wall or end to permit easy removal and disposal of the soiled littering agent.

In other embodiments the floor may be covered with a slotted or mesh material on which birds roam. Holes in this material permit passage of liquid and solid waste produced by the birds during growth. A slotted or porous floor also permits an additional mode of ventilation. In one embodiment clean air may be introduced in the poultry house through a floor plenum over which the porous or slotted floor is mounted. This provides an upward flow of clean air that may be particularly desirable in conditions of high humidity or at times when a littering agent or bedding present inside the poultry house becomes saturated with manure or waste excreted by birds. In another embodiment the surface on which birds roam is a rotating or moving manure belt that continuously provides a fresh surface onto which the chickens may roam.

Figure 1:
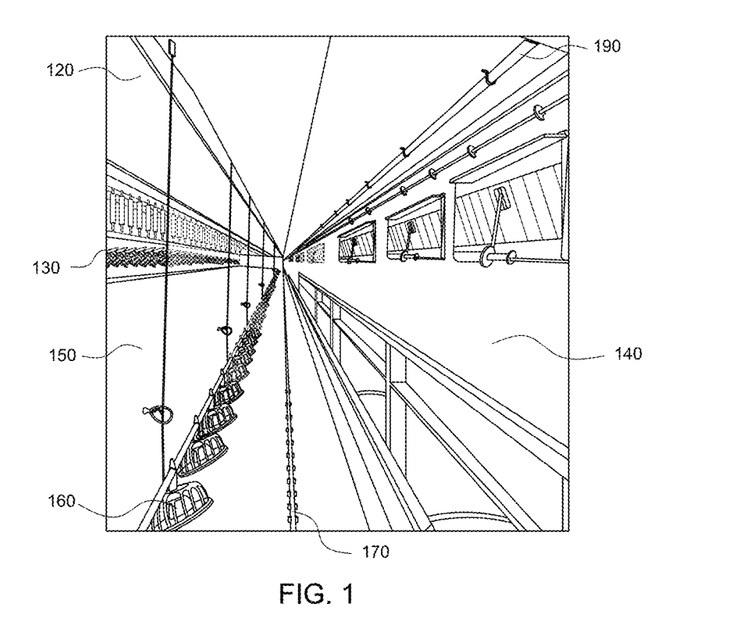
FIG. 1 shows a view down the long axis of an embodiment of the poultry house of the present disclosure.

FIG. 1 shows an interior view of one embodiment of the poultry house of the present disclosure. The view is down the length of the poultry house showing a sealed ceiling (120) that is a covered material that avoids ceiling recesses. Interior walls (140) define the lateral long sections of the poultry house and the floor is shown as (150). Lines of feed pans (130) and (160) and water drippers (170) are shown extending the length of the poultry house along its long axis.

Additional lighting may be provided by roof-mounted lighting structures placed at regularly spaced intervals along the length of the long axis of the poultry house. FIG. 1 also shows a conduit (190) which may be used to carry or hold utility or communications equipment.

The air hall described herein and shown in FIG. 3 may extend the entire length of the poultry house and represents a continuous enclosed space for pressure equalization and air flow equalization along the entire length of one side wall (e.g., defining the boundary of the interior space) of the poultry house. The air hall may be directly integrated into the poultry house or may be an extension that is a later addition that may have separate utility systems and a recessed roof (for example, a roofline that is lower than the roofline of roof covering the enclosed growing space of the poultry house). In an embodiment, the interior surfaces of the walls of the air hall are made of thin gauge steel paneling to avoid recesses or areas in which stagnant air may pool or where insects may congregate or that might otherwise harbor infectious agents or pathogens. The air hall has dimensions that are similar to the height of the enclosed space of the poultry house and provides sufficient room for easy mobility of a human carrying out maintenance or service tasks.

A similar air hall may optionally be present on the opposite side of the poultry house. A secondary air hall serves the purpose of providing unimpeded air egress from the poultry house and/or a means by which air pressure can be regulated using ventilated panels similar to the ventilation panels used to permit passage of filtered air from the air hall into the interior space of the poultry house. The secondary air hall may extend the entire length of the poultry house (e.g., the entire length of the second side wall) although, a secondary air hall is discontinuous along the wall opposite the primary air hall through which air first passes into the interior space of the poultry house. In still other embodiments the wall opposite the air hall has one or more exhaust fans which function to remove air passing in a crossflow manner through the poultry house. In an embodiment, a plurality of exhaust fans is used where such exhaust fans are mounted at locations that are roughly evenly spaced along the second side wall or other exterior wall opposite the primary air hall. Exhaust fans may be mounted at a position that is less than one half the height of the exterior wall that is opposite the air hall. In an embodiment, exhaust fans are positioned at a height that resists bird entry. Exhaust fans may be, for example, gable fans of various sizes such as 24 inch, 36 inch or 50 inch. Different sizes of gable fans may be used at different positions along the length of the air hall. In an embodiment, each of the exhaust fans is equipped with a hydraulic or spring-loaded back draft elimination system. In an embodiment, the anti-back draft system is operated by spring tension such that a cover or plate is held in place over the exhaust fan exit with spring tension in a normal resting position. Upon starting, the exhaust fan creates sufficient pressure to force the anti-back draft panel away from the exhaust fan opening to allow egress of air.

The inclusion of an air hall on the wall opposite the air ingress air hall provides other advantages. For example, having exhaust fans mounted on an exterior wall of the secondary air hall helps to control the light level inside the enclosed growing space of the poultry house. Conventional exhaust fans may permit the entry of light from sunshine through the exhaust fan fixture which may have the undesirable consequence of attracting chickens and cause them to bunch around the light source. An optional secondary air hall seals the enclosed growing space from unintended light exposure. Moreover, an optional secondary air hall permits a more even and balanced exit of air from the poultry house and less air turbulence inside the poultry house.

In an embodiment, the poultry house is constructed with gable ends at the front and back ends (termini) of the longitudinal axis of the poultry house. One or more gable fans may be present either at the front and or the back gables. Fans present on the gable ends may function separately to provide tunnel ventilation passing from one terminus to the other terminus in a lengthwise fashion down the growing space of the poultry house parallel to its axis. In an embodiment, reverse flow through any of the fans is prohibited by one or more devices which function to close if subjected to a reduced or interrupted pressure.

In an embodiment, one or more gable fans at the service room end of the poultry house function to pull air through the poultry house (e.g., air flow parallel with the long axis of the poultry house). Tunnel fans (e.g., gable fans) may be on an opposite end to service room.

Exhaust fans may also be optionally located at both the front or rear faces of the poultry house, at any height, not only at the gable ends.

In an embodiment, the front end, back end, or both ends of the poultry house is equipped with one or more large doors of sufficient size to permit entry of equipment. Two doors may be located on the gable end opposite a service room end of the poultry house.

In a further embodiment of the invention, one or more ante-chambers or service rooms with or without a personnel room/changing room are integrated into the poultry house structure, such as an exterior ancillary building or optionally as an embedded interior space. Personnel may enter the poultry house through a positive pressure service room to avoid introducing pathogens and infectious agents to the poultry growing operation. In an embodiment, the service room remains under positive pressure and provides an environment for personnel to put on protective clothing and to take precautions to avoid introducing pathogens and infectious agents into the poultry house. The service room may have a separate air egress point which permits passage of filtered air through the service room without contact or passage through the enclosed space of the poultry house.

In an embodiment, the poultry house includes a combination of positive pressure and negative pressure spaces. For efficient air circulation and lowered costs of construction, the interior poultry living/growing space is operated under negative air pressure conditions. The Exhaust fans located transversely to the long length of the poultry house function to pull air through the filter houses and through the living/growing space of the poultry house. A service room is operated under positive pressure conditions and receives filtered air concurrently with the poultry house living/growing space which is operated under negative pressure conditions. A positive service room reduces the risk that personnel and equipment that enter the poultry house introduce contamination and/or pathogens into the living/growing space of the poultry house. The service room may be located at a terminus of the axial length of the poultry house. Alternately the service room may be disposed on a side wall of the poultry house on the same or opposite side on which the filter rooms are located. In an embodiment, the service room is connected with one or more of the filter rooms, the living space of the poultry house and/or the air plenum/corridor such that only filtered air that has been treated in the filter room passes the service room.

The service room may have several access points of sufficient size to allow easy entry and exit of personnel and equipment. For example, a first access door may provide direct access to the air hall that is downstream of the evaporative pads. Further access points sufficient to allow ingress and egress of personnel may be included in one or more other locations to permit entry into the service room from outside of the poultry house. In a still further another embodiment of the invention a changing room or antechamber is directly connected to the service room and provides access into the service room through one or more additional entry points. The purpose of a changing room is to provide personnel sufficient space in which to change into clean garments or work clothes prior to entry into the service room and prior to entry into the plenum or interior space of the poultry house. Access into the plenum or interior space of the poultry house can be restricted such that an individual first enters the changing room, such as under positive pressure, then enters the service room which is under positive pressure and is pressurized with filtered air. Subsequently the individual may directly enter the living space of the poultry house or the air plenum space through one or more access doors.

In an embodiment, a changing room is likewise maintained under positive pressure from one or more forced air systems fluidly connected and downstream of the first filter of the control room. The service room is maintained at positive pressure by one or more injection fans installed at a dividing wall between the service room in the plenum or a filter room that is at a location that is downstream of the filters. The injection fan serves the purpose of moving clean filtered air into the service room to thereby maintain a positive pressure in the service room and/or the change facility. The pressure inside the service is 0-60 Pa, such as 10-50 Pa, 20-40 Pa or about 30 Pa.

Figure 5:
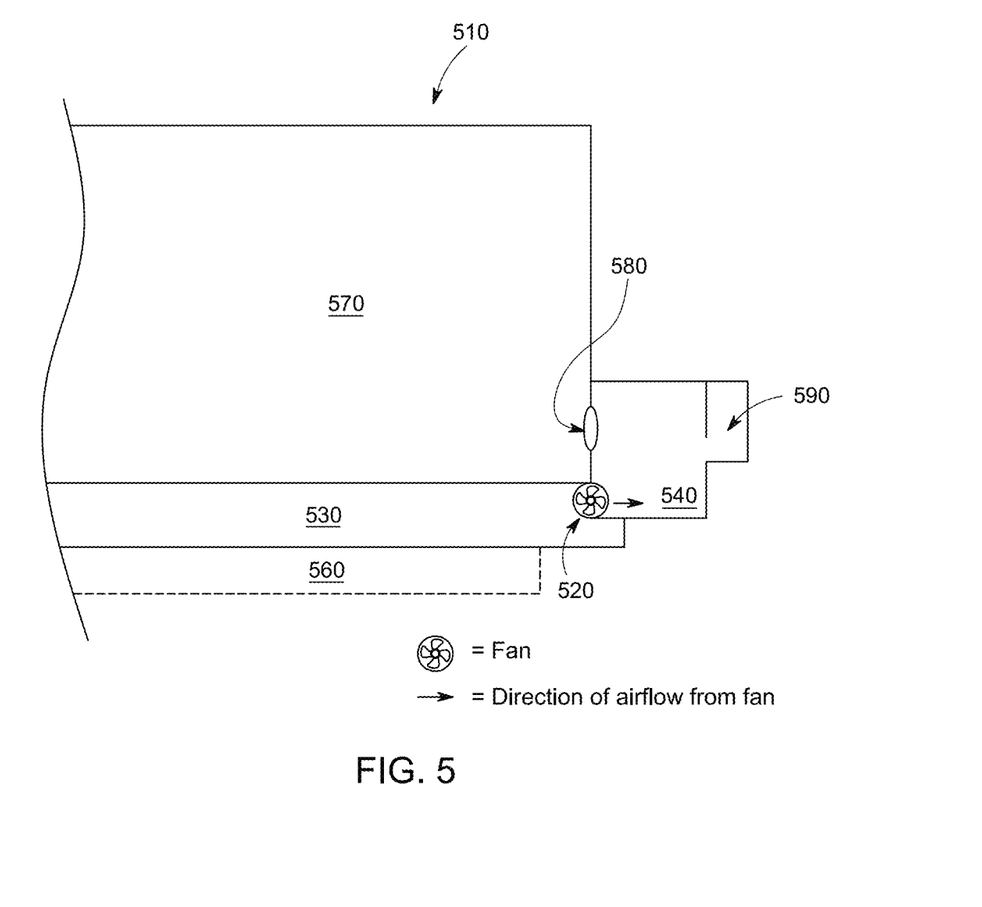
FIG. 5 shows a portion of a poultry house to an inventive embodiment of the present disclosure which is connected to a positive pressure service room.

FIG. 5 shows an embodiment of the invention in which the poultry house (510) includes a service room (540). The service room is located at a terminus (gable end) of the longitudinal axis of the poultry house. In an embodiment, the service room is in fluid connection with the air hall, and optionally the closed growing space, such that filtered air is forced into the service room after first passing through the filters and evaporative cooling mechanism of the filter room (560). The service room is maintained at a positive pressure in comparison to outside ambient air, the air pressure of the air hall and the air pressure of the enclosed growing space (570). Positive pressure is maintained by using one or more injection fans at a wall which separates the air hall from the service room. The fan is shown as (520) in FIG. 5. The fan provides a fluid connection between the air hall (530) and the interior space of the service room (540).

One or more additional fans may be used to inject filtered and optionally cooled air from the air hall into the service room. The primary injection fan (520) may be mounted as shown in FIG. 5 or alternately at an orientation that is perpendicular to the longitudinal dimension of the air hall. In another embodiment of the invention an injection fan may be mounted in the wall separating the service room from the enclosed growing space (580). Air injection into the service room from the growing space of the poultry house is less desired because the air may be affected by odor and particulate material from the growing space.

The service room may be located at an upwind end of the poultry house. For example, the end of the poultry house to which the service room is connected may also include a gable in which one or more exhaust fans are disposed for the purpose of ejecting air from the enclosed growing space.

The service room optionally includes one or more enclosed or semi enclosed spaces such as a change room (590) permitting personnel to prepare for entry into the service room. Optionally one or more entry doors permit passage of personnel from the service room into the air hall, or from the service room directly into the growing space.

One or more filter houses may be connected to or integral with the poultry house. In one embodiment the filter house may extend the entire length of the air hall (e.g., 85%, 90%, 95% or 100% of the total length of the outside wall enclosing the growing space) and/or the entire length of the poultry house (e.g., 85%, 90%, 95% or 100% of the total length of the outside wall of the poultry house not including any service room extensions). However, in an embodiment, a plurality of filter houses is used to provide a redundant filtered air supply to the air hall. A single filter house may extend a length of from 50 to 150 feet, such as 75-125 or about 100 feet down the length of the poultry house. In an embodiment, the filter house is directly connected and integral with the aerosol.

Each filter house accommodates at least three filter stages (layers) in combination with one or more evaporative cooling layers/pads. In a first layer incoming air is coarsely filtered by passage through the fibrous filter media held in place in a metal frame. Conventional filter media may be used in this first stage to remove large particles having a size of $100\mu$ or greater, such as $150\mu$ or greater, $250\mu$ or greater or $500\mu$ or greater. The filter media for the first filter stage may be a fiber-based filter that includes a tackifier or adhesive applied on at least the front or rear surface. The fibrous material, such as an inorganic or synthetic polymer material, effectively moves removes larger particles and insects.

After passage through the first filter stage, the incoming air is passed through a second filter stage that has a minimum efficiency reporting value (MERV) of 11 or greater, such as 12 or greater and even 13 or greater. The second stage filter may be a pleated filter media mounted in a cardboard cartridge. The cartridge is easily handled and installed in a holder which is aligned in parallel with the steel mesh holder used to position the filter media of the first stage filtration. The second stage filter is effective at removing materials having a particle size of $0.5\text{-}100\mu$, such as $1\text{-}50\mu$ or $5\text{-}25\mu$. The air subsequently passes through a third filter stage which includes filter cartridges, which may be mounted in sealed plastic cartridges. The third filter stage results in removal of particles having a size of $0.3\mu$ or greater at an efficiency of 98.5 to 99%. The third filter stage has an MERV rating of at least 16.

In an embodiment, the first filter and second filter stages are separated by a distance of 10 cm-1.0 m, such as 20 cm-90 cm, 30-80 cm, 40-70 cm or about 50 cm. The first filter serving the function of removing large particulate materials is more easily managed when separated from the second filter stage. The second and third filter stages may be directly in contact with one another. The second filter stage may be in direct contact with the third filter stage directly through the respective filter media or by contact of adjacent filter panels or corresponding supporting structure.

In an embodiment, the first, second/third stage filters are separated by sufficient inter-filter distance for easy personnel access for replacement or maintenance of the filters. A hallway or passageway between filter frames and other structures in the filter house may have a width of about 1 m, such as 0.5-3 m or 1.5-2.5 m.

In another embodiment of the invention the second and third filtration stages include a combination of filters having different efficiencies. In this embodiment the second and third stage filter frames include a patchwork of, for example MERV 13 and MERV 16 filter cartridges. Such an arrangement provides greater airflow through the filter house into the air hall.

After passage through the third or final filter stage, the incoming air is passed over, contacted with or passed through one or more evaporative cooling pads. The evaporative cooling pads reduce the temperature of the incoming air to a temperature of 70-90° F., such as 72-92° F., 75-92° F., 77-92° F., 82-92° F., 84-90° F. or 86-88° F. prior to entry into the enclosed space of the poultry house.

Cooling pads are supplied with water for evaporative cooling. The cooling pads can be mounted in a support and frame system that includes the piping and plumbing necessary to supply the pads with water. The plumbing system functions to spray or drip water onto the cooling pads. The pads provide cooling by evaporation of water as the air travels through the filter room and through or past the cooling pads onto which the water is adsorbed. In other embodiments of the invention the cooling pads are supplied with water by a sprinkling system that supplies a steady flow of water sufficient to keep the cooling pads saturated so that they function for evaporative cooling. In an embodiment, a water trough, gutter or water collection system is present at the bottom of the cooling pads to collect excess water and to permit its recirculation for evaporation on the cooling pads.

An automated control system may be used to coordinate and control different components of the poultry house including: the flow of water over the evaporative cooling pads, extractor fan speed, opening and closing of upper and lower air ventilation panels on sidewalls of the poultry house, heating, air pressure and food dispensing. In an embodiment, the controller is centrally programmed with instructions that automate operations of the diversity of components of the invention. For example, under circumstances where exterior air is sufficiently cool such that evaporative cooling is not needed, the controller turn offs water circulation pumps to the cooling pads thereby saving electricity and but still maintain a desirable temperature in the poultry house. Likewise, during periods when the outside air temperature is less than that required inside the poultry house, the controller is programmed with instructions to initiate interior heating elements with sufficient electricity to maintain a desirable temperature. Temperature, humidity and optionally air flow sensors inside and outside the poultry house function to provide data to the controller from which the controller's logic identifies favored conditions to minimize utility costs while concurrently maintaining steady and desirable conditions or animal comfort and productivity. Exemplary commercially available controllers for this purpose include those provided by Skov of Denmark.

In one embodiment of the invention the aqueous material that is sprayed or dripped on the cooling pads for evaporative cooling contains one or more antiseptic agents in liquid or dissolved form. Antiseptic agents may optionally include, for example, alcohols or anti-bacterial agents. In an embodiment, the evaporative cooling system uses cooling pads (such as paper, wood veneer or fibrous mat) that may be constantly moistened with water. The evaporative cooling pad does not serve the function of filtration of particulate matter from the incoming air. Instead, the cooling pads serve the purpose of reducing the temperature of the incoming air.

In order to minimize the pressure differential between the interior pressure and ambient exterior pressure, the filter area may be maximized. For example, the length of the filter rooms may extend the entire length of the air hall. In this embodiment a single filter hall extends the entire length of the air hall, and the filter hall and air hall are integrated and continuous along the entire length of the poultry house, e.g., a length that is representative of the interior length corresponding with the interior space of the poultry house. The ratio of the total length of the air hall corresponding with the interior wall of the interior space of the poultry house to the filter length may be 1:0.2, 1:0.3, 1:0.5, 1:0.6, 1:0.7, 1:0.8, 1:0.9 or 1:1. In an embodiment of the invention, a poultry house that is 150 m in length and has a filter wall length of about 75 m. A side wall height of about 2.5 m typically uses a filter height of about 2 m. The ratio of the exterior wall height to the filter height may be about 1:0.4, such as 1:0.5, 1:0.6, 1:0.7 or 1:0.8. An increase in the total filter area relative to the total length of the air hall, which typically is in relation to the required ventilation and fan capacity, permits an incremental reduction in the pressure differential between the enclosed space of the poultry house and ambient exterior pressure.

The total exterior-exposed filter area is a likewise maximized with respect to a total boundary wall area of the side wall that defines the length of the interior space within the poultry house. The ratio of the area of the filter wall to the total exterior area of the air hall (e.g., air hall area:filter face area) is 1:0.25, 1:0.3, 1:0.35, 1:0.4, 1:0.45, 1:0.5, 1:0.55, or 1:0.6. The filter wall area is based on the entire surface area of the first stage filter to which outside air is first subjected to a coarse filtration, including the area of the filter wall corresponding to filter supports, frames and/or mesh. In an embodiment, the area of the filter wall representing supports, frames and/or mesh is less than 0.1, 0.05, 0.25 or 0.1% of the total area of the filter wall area measured across the longest length and width of a filter unit.

Figure 4:
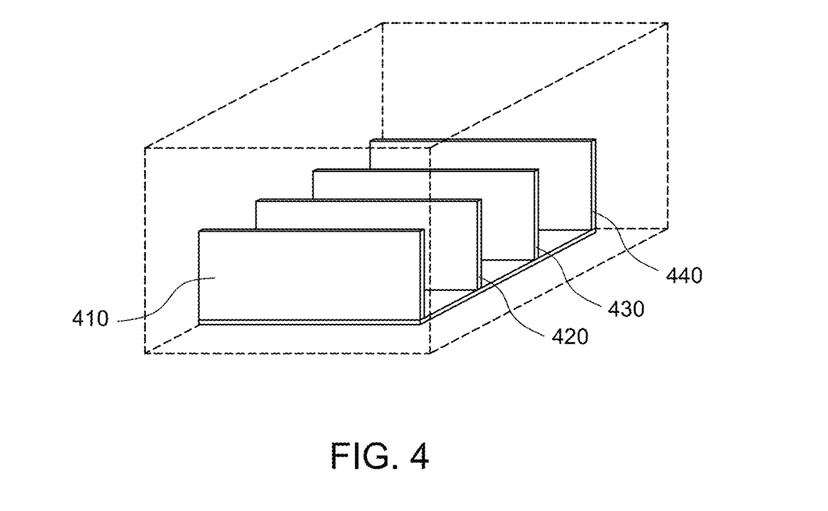
FIG. 4 shows filtration stages of a filter house.

FIG. 4 shows an arrangement of representative filtering stages in a filter house. The first stage filter (410) represents the fiber filter medium that is used to remove large particles from the incoming airstream prior to further filtration and prior to contact with the evaporative cooling pads. In a negative pressure operating mode, it is typical that there is no injection or exhaust fan preceding or immediately subsequent to the first (410), second (420) or third stage (430) filters. In an embodiment, when operating under negative pressure conditions the entire filter house and air hall system does not include any forced air ventilation that injects and/or forces outside ambient air through any filter stage for passage through the air hall and into the enclosed space of the poultry house. In contrast when operating in a positive pressure mode, an air injection fan or air supply fan may be mounted upstream or downstream of the first stage filter. In other embodiments an air supply or forced air fan may be located between the first and second stage filters, between the second and third stage filters, between the third stage filter and the evaporative cooling pads or downstream of the evaporative cooling pads prior to injection of cooled and filtered air into the air hall.

The second stage filter is shown as 420. The second stage filter may be set apart from the first stage filter mounting apparatus such that access to filter cartridges or filter media can be accomplished efficiently. In an embodiment, there is no standoff space between the second stage (420) and third stage (430) filters. The third stage filter may be separated by a distance from the evaporative cooling pads (440) or be in direct contact with the cooling pads.

The total individual surface areas of the filter media of the first, second and third stages, respectively, are typically about the same. For example, the filter areas of filters of different stages do not vary by more than 25%, such as not varying more than 20%, 15%, 10%, 5% or 1% based on the total area of the filter face. When the filter areas between different stages are similar or the same, supply and planning procedures necessary are simplified and pressure differential between filter stages are minimized. The first stage filter allows greater air flow than the second stage filter. The second stage filter allows greater airflow than the third stage filter.

Figure 6:
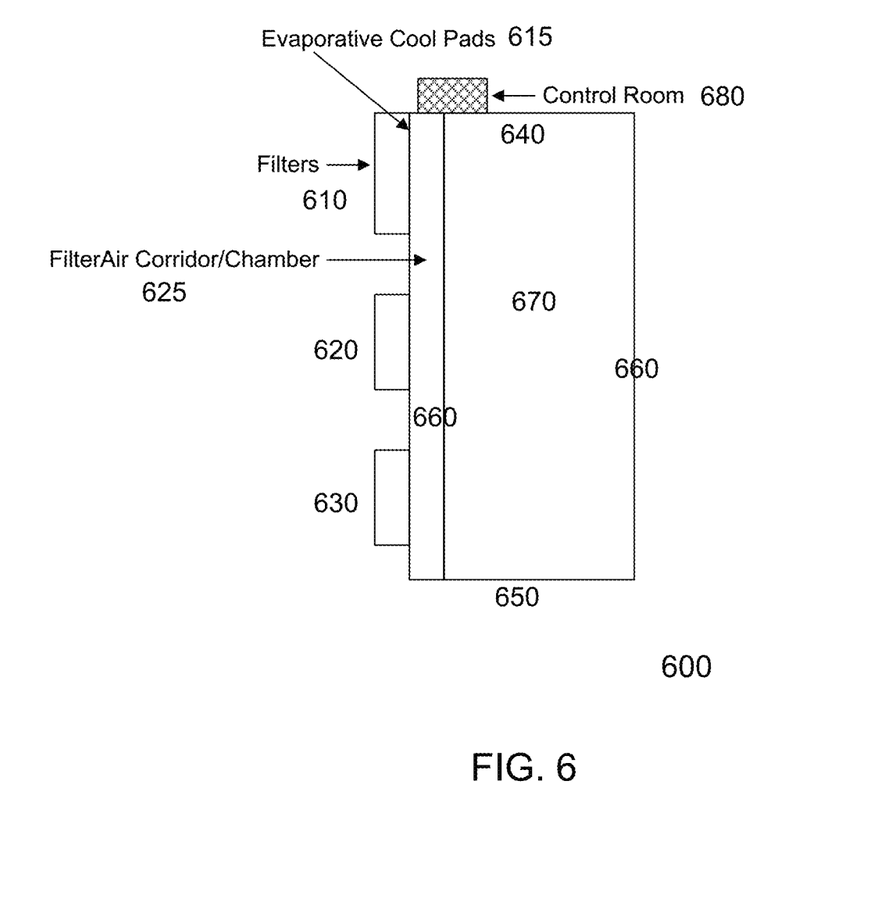
FIG. 6 shows a top perspective of a poultry house which has three filter rooms, according to an inventive embodiment of the present disclosure.

Reference will be made to FIG. 6 showing a top perspective of a livestock house, such as a poultry house 600 which has three filter rooms 610, 620 and 630 and an air corridor/chamber 625 on one side of the house. The poultry house air filtration system according to this embodiment includes a tunnel section having a long axis with a front end 640, a back end 650, first and second side walls 660 and a roof (not shown).

A tunnel section defined by the front 640, back 650 and side 660 walls forms an interior space for growing poultry 670 and has a plurality of exhaust fans to draw air through an air filtration section.

In one embodiment, one or more air filter rooms (610, 620, 630) for maintaining filtrations sections such as filter house(s) comprising filter screens mounted substantially parallel to the long axis of the tunnel section and fluidly connected to an air hall section connecting the filtration section to the interior space and exhaust fans. The filters rooms may further comprise evaporative cooling pads 615 to cool the filtered air before it enters the air corridor/chamber 625.

In another aspect, the poultry house is configured to pass clean air into the interior space by passage of outside air through the filter screens into the interior space and out through the second side wall 660.

In another aspect, the poultry house includes a service room 680 connected to the front end 640 of the tunnel section, one or more service room fans located in a service wall separating the service room interior space from the poultry house interior space and which force air from downstream of the air filtration section into the service room 680 and maintain the service room 680 at a positive air pressure, e.g., greater than the exterior air pressure of the house or the pressure of the interior space for growing poultry 670.

Figure 7:
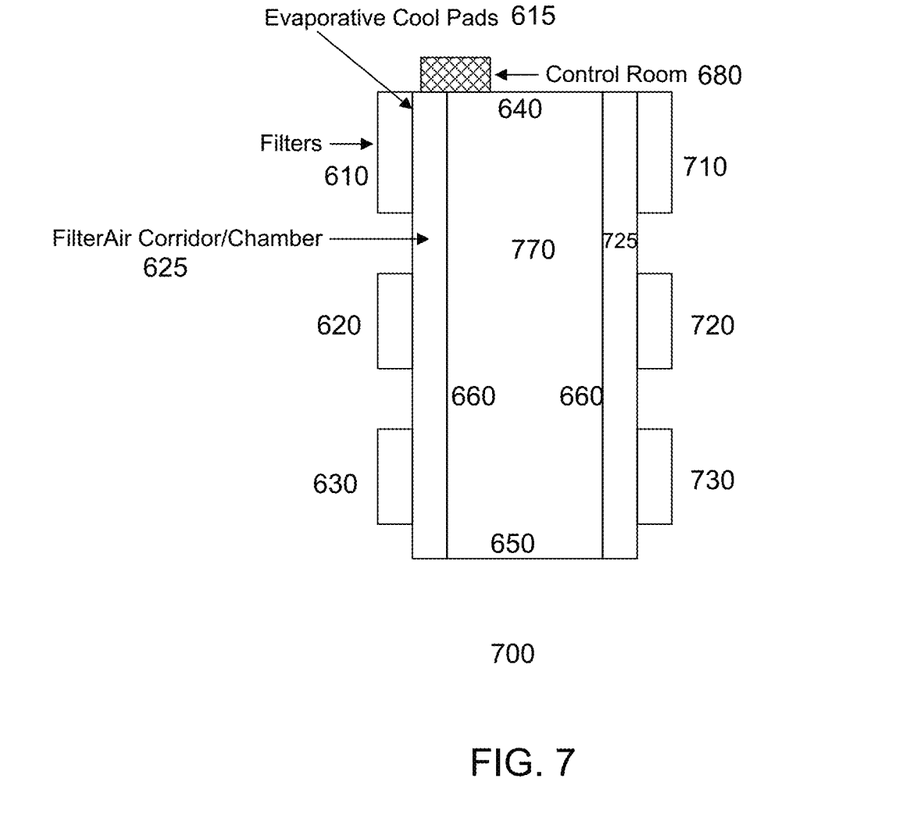
FIG. 7 shows a top perspective of a poultry house which has three filter rooms and air corridor/chamber located on both sides of the poultry house, according to an inventive embodiment of the present disclosure.

Reference will be made to FIG. 7, which shows almost the identical house shown in FIG. 6, but which has three filter rooms and air corridor/chamber located on both sides of the house. In this inventive embodiment, the poultry house 700 has three filter rooms and an air corridor/chamber running down both long sides of the house. Thus, in addition to the filter rooms on one side (e.g., 610, 620 and 630) and an air corridor/chamber 625 on one side of the house, the embodiment in FIG. 7 shows corresponding elements, such as filter rooms (e.g., 710, 720 and 730) and an air corridor/chamber 725 on the other side of the house.

In another aspect, the poultry house has exhaust fans equipped with one way flow devices to prevent flow of outside air into the interior space through the exhaust fans.

In another aspect, the poultry house has a first screen comprising layers of fibers, a second screen comprising cartridges of a filter media, and a third screen comprising a pleated filter media.

In another aspect, the poultry house has an air hall extending the entire length of the first sidewall 625.

In another aspect, the poultry house has at least two filter houses (610, 620, 630) connected to an air corridor, chamber, or hall (as these terms are used interchangeably) that runs down one long axis of the house (625). In another aspect, the poultry house has filter houses (710, 720, 730) connected to an air corridor, chamber, or hall that runs down both long axes of the house (725).

In another aspect, the poultry house has an air hall fluidly connected to an interior space through one or more ventilation panels mounted in the first side wall.

In another aspect, the poultry house further comprises one or more lower ventilation panels at a height that is less than 0.5 times the height of a first side wall.

In another aspect, the poultry house has a filter house containing evaporative cooling pads.

In another aspect, the poultry house has no fan is present upstream of a first filter screen, a second filter screen, a third filter screen and evaporative pads.

In another aspect, the poultry house is operated such that the interior space is at a pressure less than an ambient atmospheric pressure outside of the poultry house.

There is also disclosed a method for mitigating airborne pathogens from a livestock house, such as a house for chickens or other fowl, as described herein. In an embodiment, the method comprises using a cross-flow ventilation system, which is fluidly connected to a livestock house comprising two long and parallel sidewalls and two short end walls that are parallel to each other and perpendicular to the side walls to form a tunnel section of the house, wherein the cross-flow ventilation system is configured to control the air quality and movement by the following: introducing ambient air into at least one air filtration system that is attached to a side wall of the house; conditioning the air in the air filtration system by performing at least one step selected from filtering, cooling, disinfecting, or pressurizing the air; introducing the conditioned air into an air chamber; flowing the conditioned air from the air chamber into the house through at least one ventilation panel to the opposing sidewall with a laminar or substantially laminal flow of air; and removing the air from the house using an exhaust fan attached to a side wall opposite the side wall containing the air filtration system.

According to one embodiment of the disclosure, in the method the conditioned air flows from one side wall to the other side wall at a rate of 0.1 to 5 m/s. As previously described, the method further comprises controlling at least one ventilation device to control various parameters such as the temperature, pressure, humidity, $CO_2$ level in the livestock house.

In an embodiment, controlling the ventilation device is performed by a microprocessor which is connected to one or more air pushers, exhaust fans, or anti-back-draft device. For example, the microprocessor may be connected to a $CO_2$ sensor, a temperature sensor, a pressure sensor, a humidity sensor, or a livestock mass sensor.

In an embodiment, the method described herein further comprises maintaining a positive pressure ranging from 1-60 Pascal, such as 10-60 Pascal greater than ambient pressure in a control room connected to one end of the tunnel section by using at least one control room fan. The positive pressure in the control room is maintained by a fan pumping filtered air from the air corridor into the control room. The fan may be controlled by a variable speed drive (VSD) and fan speed can be set to desired speed as required. The fan typically runs 24 hours per day to maintain positive pressure in the control room. In addition, once a door into the control room is opened a sensor indicates this to the VSD and the fan increases speed to maintain a positive pressure in the control room.

In an embodiment, the method further comprises controlling the air pressure in order to maintain a negative pressure ranging from 1-70 Pascal, such as 5-70 Pascal less than ambient pressure in the tunnel section of the livestock house.

In one embodiment, the method further comprises pulling air from an end wall with a exhaust fan to cause a turbulent flow of air down the long axis of the house.

In one embodiment, the method further comprises cooling the air after it leaves the filtration system and before it enters the house by passing it over one or more evaporative cooling pads.

In one embodiment, the method further comprises adjusting the flow of water over the evaporative cooling pads to increase or decrease cooling rate of the air.

The livestock house described herein is typically used for poultry, such as chickens or turkeys or other fowl. However, the livestock house may also be used for other animals including cows, cattle, sheep, goats or pigs.

In an embodiment, the airborne pathogens comprise avian influenza, *E-coli* infection, infectious bronchitis, and Newcastle Disease as well as air borne or food borne pathogens formed by, e.g., *Salmonella, E-coli*, and *Campylobacter*. Particular improvements can be noted with diseases such as H9N2 Low Pathogenic Avian Influenza (LPAI), Highly Pathogenic Avian Influenza (HPAI), *Mycoplasma synoviae, Salmonella* spp., and Infectious Laryngotrachieitis (ILT), and combinations thereof.

As used herein, the words "about," "approximately," or "substantially similar" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), +/−15% of the stated value (or range of values), or +/−20% of the stated value (or range of values). Within the description of this disclosure, where a numerical limit or range is stated, the endpoints are included unless stated otherwise. Also, all values and subranges within a numerical limit or range are specifically included as if explicitly written out.

We claim:

1. A method for mitigating airborne pathogens from a livestock house, said method comprising:
 using a cross-flow ventilation system, which is fluidly connected to the livestock house comprising two parallel sidewalls and two end walls that are parallel to each other and perpendicular to said sidewalls to form a tunnel section of said livestock house, wherein the two parallel sidewalls are longer than the two end walls and the cross-flow ventilation system is configured to control air quality and movement by:
 introducing ambient air into at least one air filtration system that includes one or more multistage filters and that is attached to a sidewall of the two sidewalls of the livestock house;
 conditioning the ambient air in said at least one air filtration system by performing at least one step selected from filtering, cooling, disinfecting, or pressurizing said ambient air to form conditioned air;
 introducing the conditioned air into an air chamber that extends at least 60% of a length of at least one of the two parallel sidewalls;
 flowing the conditioned air from the air chamber into the livestock house through at least one ventilation panel to an opposing sidewall of the two parallel sidewalls with a laminar or substantially laminar flow of air; and
 removing exhaust air from the livestock house using an exhaust fan attached to the opposing sidewall opposite the at least one air filtration system.

2. The method of claim 1, wherein said conditioned air flows from the sidewall to the opposing sidewall at a rate of 0.1 to 5 m/s.

3. The method of claim 1, further comprising controlling at least one ventilation device to control temperature, pressure, humidity, or $CO_2$ level in the livestock house.

4. The method of claim 3, wherein controlling said ventilation device is performed by a microprocessor which is connected to one or more air pushers, exhaust fans, or anti-back-draft device.

5. The method of claim 4, wherein the microprocessor is connected to a $CO_2$ sensor, a temperature sensor, a pressure sensor, a humidity sensor, or a livestock mass sensor.

6. The method of claim 4, further comprising controlling air pressure in order to maintain a negative pressure ranging from 1-70 Pascal less than ambient pressure in the tunnel section.

7. The method of claim 1, further comprising maintaining a positive pressure ranging from 1-60 Pascal greater than ambient pressure in a control room connected to one end of the tunnel section by one or more control room fan pumping filtered air from an air corridor into the control room.

8. The method of claim 7, wherein the one or more control room fan is controlled by a variable speed drive.

9. The method of claim 1, further comprising pulling air from one end wall of the end walls with an exhaust fan to cause a turbulent flow of air down a long axis of the livestock house.

10. The method of claim 1, further comprising cooling the conditioned air after it leaves the at least one air filtration system and before it enters the livestock house by passing the conditioned air over one or more evaporative cooling pads.

11. The method of claim 10, further comprising adjusting a flow of water over the one or more evaporative cooling pads to increase or decrease cooling rate of the conditioned air.

12. The method of claim 1, wherein the livestock house comprises poultry, cows, cattle, sheep, or goats.

13. The method of claim 12, wherein the poultry comprises chickens or turkeys.

14. The method of claim 12, wherein said airborne pathogens comprise avian influenza, *E-coli* infection, infectious bronchitis, and Newcastle Disease as well as air borne or food borne pathogens formed.

15. The method of claim 12, wherein said airborne pathogens comprise *Salmonella, E-coli*, and *Campylobacter*.

16. The method of claim 12, which mitigates an occurrence of Low Pathogenic Avian Influenza (LPAI), Highly Pathogenic Avian Influenza (HPAI), *Mycoplasma synoviae, Salmonella* spp., Infectious Laryngotrachieitis (ILT), and combinations thereof.

17. The method of claim 1, wherein the air chamber extends at least 70% of the length of at least one of the two parallel sidewalls.

18. The method of claim 1, wherein the air chamber extends at least 80% of the length of at least one of the two parallel sidewalls.

19. The method of claim 1, wherein the air chamber extends at least 90% of the length of at least one of the two parallel sidewalls.

* * * * *